Figure 1:
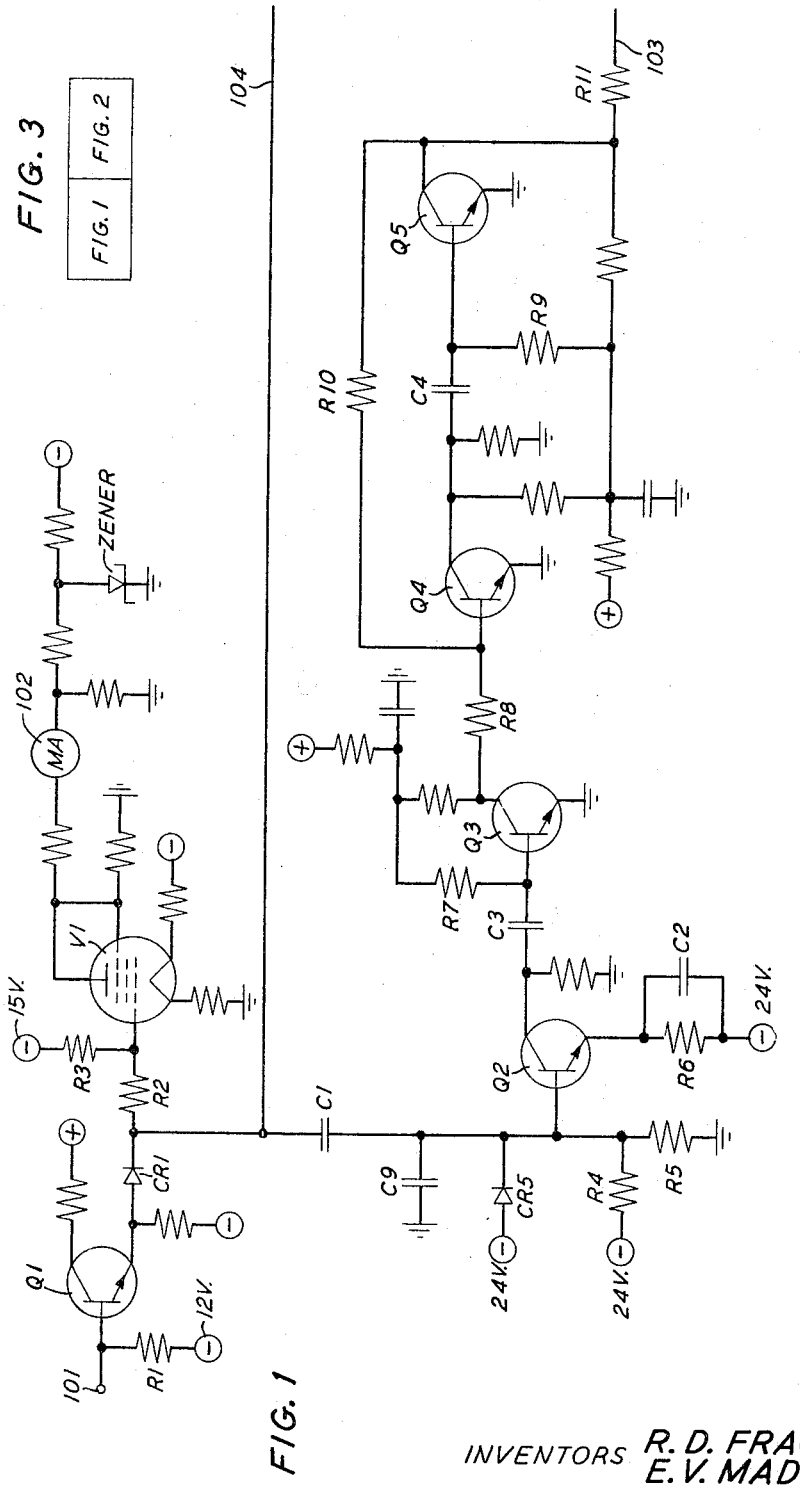

Jan. 3, 1967  R. D. FRACASSI ETAL  3,296,458
PEAK INDICATOR

Filed Nov. 15, 1963  2 Sheets-Sheet 2

United States Patent Office 3,296,458
Patented Jan. 3, 1967

3,296,458
PEAK INDICATOR
Renato D. Fracassi, Middletown, and Eric V. Madsen, New Shrewsbury, N.J., assignors to Bell Telephone Laboratories, Incorporated, New York, N.Y., a corporation of New York
Filed Nov. 15, 1963, Ser. No. 323,980
7 Claims. (Cl. 307—88.5)

This invention relates to a peak indicator circuit and more particularly to a circuit for indicating the peak amplitudes of voltage pulses.

It is a broad object of this invention to detect the peak amplitudes of voltage pulses.

The measurements of random voltage pulses having short time durations may be observed when the average repetition rate is sufficiently low through the utilization of an integrating meter. The voltage pulse to be measured is ordinarily applied to an integrating capacitor having a discharge rate which is sufficiently slow to enable the observer to perceive the deflection of the meter needle. Since the meter needle follows the decay of the discharge current, it is preferable to further slow up the discharge rate. If the capacitor is then rapidly discharged during the initial position of the slow discharge cycle, a relatively constant meter reading proportionate to the peak amplitude of the pulse is obtained.

The rapid discharge of the capacitor is conveniently controlled by a time delay circuit whose operation is initiated when the pulse to be measured is applied to the integrating capacitor. Circuits for detecting the applied pulse, however, tend to reduce the capacitor charge or increase the discharge rate. In addition, difficulty is encountered in detecting pulses which supply only a small incremental increase to the capacitor charge. Furthermore, in the event that a new pulse is received just prior to the termination of the time delay period initiated by the previous pulse, the meter deflection may not be perceived and the reading thereby lost.

It is an object of this invention to detect the application of pulses to the integrating capacitor without effecting the charge on the capacitor or the discharge rate.

Another object of this invention is to detect small incremental changes of the capacitor charge.

A further object of this invention is to preclude the loss of a meter reading when a new pulse is received prior to the termination of the delay interval initiated by the previous pulse.

It is a feature of this invention to initiate the delay interval in response to the momentary surge of the charging current developed by the pulse to be measured. Thus, this delay initiating circuit need not shunt the high impedance integrating circuit, therefore eliminating the effect on the capacitor discharge rate.

It is another feature of this invention to present a low impedance to charging current and a high impedance to discharging current in the initiating circuit. Small increases in the charging current can thus be readily detected without increasing the discharging rate.

It is a further feature of this invention to reinitiate the delay interval in response to any incremental increase in the charging current.

Figure 2:
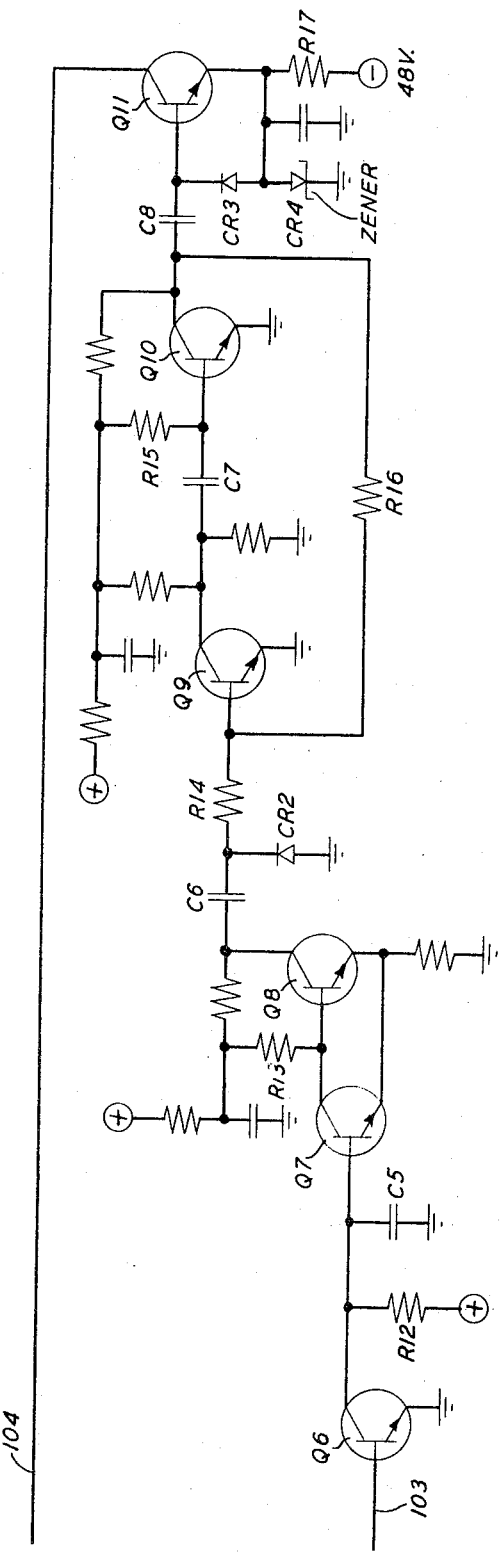

The foregoing and other objects and features of this invention will be fully understood from the following description of an illustrative embodiment thereof taken in conjunction with the accompanying drawing wherein:

FIGS. 1 and 2, when arranged as shown in FIG. 3, show the details of circuits and equipment which cooperate to form a peak indicator in accordance with this invention.

Referring now to FIG. 1, input signals are applied to terminal 101 which is connected to the base of transistor Q1. The input signals constitute the signals to be measured and, in accordance with the specific embodiment herein described, the signals may comprise short voltage pulses which vary in amplitude from minus 12 volts to plus 8 volts. A negative 12 volt supply connected to the base of transistor Q1 by way of resistor R1 represents the normal negative voltage applied to the input during no-signal conditions.

Transistor Q1 is arranged as an emitter follower. Accordingly, the signals applied to diode CR1 by the emitter of transistor Q1 follow the input signals.

The cathode of diode CR1 is connected to the upper plate of capacitor C1, as shown in FIG. 1. Diode CR1 is also connected to negative 15 volt supply through resistor R2 and resistor R3, resistor R2 having a substantially high impedance. During the idle signal condition minus 12 volts are applied to the anode of diode CR1. The diode is thus forward biased to its linear region, charging up capacitor C1 to the voltage on the emitter of transistor Q1 minus the drop due to diode CR1. Similarly, any signal input in excess of the minus 12 voltage signal charges up capacitor C1 by way of diode CR1.

The discharge path of capacitor C1 is primarily resistor R2 and resistor R3. The junction of resistors R2 and R3 is, in turn, connected to the grid of vacuum tube V1. Vacuum tube V1, in turn, drives meter 102. Accordingly, the slow decay of the charge on capacitor C1 through resistors R2 and R3 is followed by the meter needle of meter 102.

The lower plate of capacitor C1 is connected to a voltage divider comprising resistors R4 and R5, the base circuit of transistor Q2 and capacitor C9, which capacitor functions to filter out noise on the base of transistor Q2. The emitter of transistor Q2 is connected through resistor R6 to negative battery. Voltage dividers R4 and R5 function to apply a voltage to the base of transistor Q2, which is slightly positive with respect to the potential applied through resistor R6 to the emitter of transistor Q2. Accordingly, a small increment of current is drawn through the base-to-emitter path of transistor Q2 and a correspondingly small amount of current flows through the collector-to-emitter path.

Assuming now that a new reading higher than the previous reading is received at terminal 101, capacitor C1 receives a higher charge, as previously described. When the higher charge is placed on capacitor C1, charging current flows through capacitor C1 and finds a low impedance path comprising the base-to-emitter path of transistor Q2 and capacitor C2. This momentary incremental increase in the base current causes the collector-to-emitter path to draw more current for a short interval of time. This sudden increase in current is drawn by way of capacitor C3 from the base circuit of transistor Q3.

The emitter of transistor Q3 is connected to ground and the base is connected to positive battery by way of resistor R7. Accordingly, in the normal quiescent condition, transistor Q3 is conducting and the collector current of transistor Q2 robs the base of transistor Q3 of its quiescent base current, substantially reducing the collector-to-emitter flow of transistor Q3, and thus causing a momentary rise in the collector voltage. This voltage change is applied to the base of transistor Q4 by way of resistor R8.

Transistor Q4, together with transistor Q5, is arranged as a monopulser. In the normal quiescent condition, positive battery is applied to the base of transistor Q5 by way of resistor R9. Since the emitter of transistor Q5 is connected to ground, the transistor is rendered conductive, resulting in a ground potential on the collector thereof. This ground potential is applied back to the base of transistor Q4 through resistor R10. Recalling now that the collector of transistor Q3 is at ground potential in the quiescent condition, which ground is applied through resistor R8 to the base of transistor Q4, transistor Q4 is rendered nonconductive.

When the charging current from capacitor C1 causes the collector potential of transistor Q3 to go positive, the resultant positive-going potential on the base of transistor Q4 turns the transistor ON. This results in a negative-going potential on the collector of transistor Q4, providing a negative pulse through capacitor C4 to the base of transistor Q5. Transistor Q5 accordingly, turns OFF, removing the ground potential at the collector thereof, which potential, as previously described, is applied to the base of transistor Q4. Capacitor C4 now proceeds to charge to positive battery by way of resistor R9. When capacitor C4 charges sufficiently to bring the base voltage of transistor Q5 above ground, transistor Q5 turns back ON, reapplying ground to the base of transistor Q4 by way of resistor R10. This turns transistor Q4 OFF, since the collector of transistor Q3 has already returned to ground. Thus, the monopulser comprising transistors Q4 and Q5 is back to its initial condition.

The collector of transistor Q5 is connected to the base of transistor Q6 (FIG. 2) by way of resistor R11 and lead 103. In the quiescent condition, with ground on the collector of transistor Q5 and the emitter of transistor Q6 connected to ground, the latter transistor is maintained in the nonconductive state. When transistor Q5 is momentarily turned OFF, a positive-going potential from the collector thereof turns ON transistor Q6. The subsequent restoration of transistor Q5 to the conductive condition restores, in turn, transistor Q6 to the nonconductive condition.

The collector of transistor Q6 is connected to timing capacitor C5 and to positive battery by way of resistor R12. In the normal condition, with transistor Q6 turned OFF, capacitor C5 is charged to a positive potential through resistor R12. When transistor Q6 is momentarily turned ON, as previously described, capacitor C5 rapidly discharges through the collector-to-emitter path of transistor Q6, completely discharging capacitor C5. The subsequent restoration of transistor Q6 to the nonconductive condition then permits capacitor C5 to recharge up to positive battery by way of resistor R12.

Capacitor C5 is connected to the base of transistor Q7 thereby applying the charge thereon to the transistor. Transistor Q7, together with transistor Q8, is arranged as a trigger circuit. As previously described, a positive charge is normally applied by capacitor C5 to the base of transistor Q7. This renders transistor Q7 conductive, thereby shunting the base-to-emitter path of transistor Q7. Accordingly, transistor Q8 is normally nonconductive.

When transistor Q6 is momentarily turned ON, discharging capacitor C5, the ground on the collector of transistor Q6 is applied to the base of transistor Q7, turning the latter transistor OFF. A positive potential is thereby applied to the base of transistor Q8 by way of resistor R13, and transistor Q8 turns ON. With transistor Q8 conductive, collector-to-emitter current is drawn therethrough, driving the emitter thereof positive, and the collector negative. The negative-going collector voltage is passed through capacitor C6 and then shunted to ground by diode CR2.

The subsequent restoration of transistor Q6 then permits capacitor C5 to recharge. This raises the potential on the base of transistor Q7. The constants of capacitor C5, resistor R12 and the positive battery connected thereto, is such that the charge on the capacitor will exceed the potential on the emitter of transistor Q7 after approximately two seconds from the time that capacitor C5 starts to recharge. The base of transistor Q7 is thereby forward-biased with respect to the emitter and transistor Q7 is again rendered conductive, shunting the base-to-emitter path of transistor Q8. Transistor Q8 is thus restored to the nonconductive condition. The consequent positive-going potential on the collector of transistor Q8 is passed by way of capacitor C6 and resistor R14 to the base of transistor Q9.

Transistor Q9 and transistor Q10 are arranged as a monopulser in a manner similar to transistors Q4 and Q5. In the normal quiescent condition positive battery applied by way of resistor R15 to the base of transistor Q10 renders the transistor conductive. This places ground potential on the collector of transistor Q10, which potential is applied by way of resistor R16 to the base of transistor Q9, maintaining this latter transistor nonconductive.

The application of a positive voltage pulse through capacitor C6 to the base of transistor Q9 turns the transistor ON. The consequent negative-going collector potential of transistor Q9 is applied by way of capacitor C7 to the base of transistor Q10. Transistor Q10 turns OFF, driving its collector potential in a positive-going direction. Capacitor C7 now proceeds to charge by way of resistor R15 and when the charge of capacitor C7 exceeds the emitter potential of transistor Q10, the transistor turns back ON, reapplying the ground on the collector thereof by way of resistor R16 to the base of transistor Q9. Transistor Q9 is thereby turned OFF, restoring the monopulser to its initial condition.

When transistor Q10 turns OFF, its positive-going collector potential applies a positive pulse by way of capacitor C8 to the base of transistor Q11, momentarily rendering the latter transistor conductive. The emitter of transistor Q11 is connected to a voltage divider comprising Zener diode CR4 and resistor R17. In the specific embodiment disclosed herein, the breakdown voltage of Zener diode CR4 is aproximately 12 volts placing a negative potential of 12 volts on the emitter of transistor Q11. Accordingly, when transistor Q11 is momentarily rendered conductive, a low impedance discharge path to minus 12 volts for capacitor C1 is provided by way of lead 104 and the collector-to-emitter path of transistor Q11. The path for the discharge current surge is completed to the lower plate of capacitor C1 by way of diode CR5 since the drop in voltage on the lower plate resulting from the capacitor discharge forward biases diode CR5. Accordingly, a low impedance path shunting resistors R2 and R3 is completed permitting the rapid discharge of capacitor C1 after approximately two seconds as determined by timing capacitor C5. Capacitor C1 is thus discharged to its initial condition wherein a negative 12 volt charge is applied thereto approximately two seconds after the capacitor was charged by the new reading.

The restoration of transistor Q10 to its conductive condition and the consequent negative-going collector potential thereof, is passed through capacitor C8 and shunted by diode CR3 to the emitter of transistor Q11. Transistor Q11, however, is only momentarily rendered conductive when transistor Q10 turns OFF and the subsequent negative pulse has no effect thereon.

The circuit is also arranged to restart the timing process if a new reading higher than the previous one is received before the time-out of the timing circuit. This new reading will apply a higher charge to capacitor C1, which charge is followed by meter 102 in the same manner as previously described. In addition, the new charging current to the base of transistor Q2 increases its collector-to-emitter current, again robbing transistor Q3 of its base current. Transistor Q3 thus develops a positive-going collector potential, as previously described, and this voltage change is applied to the base of transistor Q4 by way of resistor R8. The application of the positive-going potential to the base of transistor Q4 operates the monopulser constituting transistors Q4 and Q5, whereby transistor Q5 is rendered nonconductive. The consequent positive-going collector potential of transistor Q5 is thus applied through resistor R11 and lead 103 to the base of transistor Q6, turning ON the latter transistor. With transistor Q6 turned ON, capacitor C5 is discharged through the collector-to-emitter path of transistor Q6, resetting the timing circuit. The subsequent restoration of the monopulser wherein transistor Q5 is turned back ON, reapplies ground to the base of transistor Q6. Transistor Q6 thus turns OFF and capacitor C5 again starts to charge to positive battery by way of resistor R12. After about two seconds, capacitor C5 charges sufficiently to operate the trigger circuit comprising transistors Q7 and Q8 and the trigger circuit, in turn, operates the monopulser comprising transistors Q9 and Q10 in the same manner as previously described. Accordingly, transistor Q11 is rendered conductive at the termination of the new timing period to discharge capacitor C1. It is thus seen that a new higher reading restarts the timing process over again so that the new reading is not lost.

Although a specific embodiment of this invention has been shown and described, it will be understood that various modifications may be made without departing from the spirit of this invention and within the scope of the appended claims.

What is claimed is:

1. In a peak detecting circuit, a capacitor, an impedance connected across said capacitor for providing a current discharging path, output means connected to said impedance, means connected to said capacitor for providing a low impedance to charging current and a high impedance to discharging current, voltage pulse input means connected to said capacitor for applying a voltage pulse across said capacitor and said low impedance means, and current operated timing means including said low impedance means responsive to said charging current through said low impedance means and having a delay interval exceeding the duration of said voltage pulse for discharging said capacitor at the termination of said delay interval, said current operated means being connected in series with said capacitor.

2. In a peak detecting circuit, a source of voltage pulses, a capacitor having one side thereof connected to said source for detecting the amplitude of said pulses, an impedance connected to said one side of said capacitor to form an integrating circuit, output means connected to said integrating impedance, a current path connected to the other side of said capacitor, said path including unidirectional conductive means and biasing means for presenting a low impedance to charging current, means for providing a delay interval exceeding the duration of said voltage pulses, low impedance current discharging means for momentarily shunting said integrating impedance after said delay interval, and means responsive to an incremental increase of charging current through said unidirectional conductive means for initiating a new delay interval.

3. In a peak detecting circuit in accordance with claim 1 wherein said timing means is responsive to an incremental increase of said charging current through said low impedance means for initiating a new delay interval.

4. In a peak detecting circuit in accordance with claim 1 wherein said timing means includes a low impedance discharging means for momentarily shunting said current discharging path impedance.

5. In a peak detecting circuit in accordance with claim 2 wherein said unidirectional conductive means includes a transistor base-to-emitter path.

6. In a peak detecting circuit in accordance with claim 5 wherein said biasing means is connected across said base-to-emitter path for normally providing an increment of current therethrough.

7. In a peak detecting circuit in accordance with claim 5 wherein said means responsive to an incremental increase of charging current includes a collector-to-emitter path of said transistor.

References Cited by the Examiner
UNITED STATES PATENTS 2,961,537  11/1960  Turner _____ 328—151
3,067,344  12/1962  Branum et al. _____ 307—88.5

ARTHUR GAUSS, *Primary Examiner.*

J. ZAZWORSKY, *Assistant Examiner.*